United States Patent
Semke et al.

(10) Patent No.: US 10,701,151 B2
(45) Date of Patent: Jun. 30, 2020

(54) METHODS AND SYSTEMS FOR ACCESSING VIRTUAL STORAGE SERVERS IN A CLUSTERED ENVIRONMENT

(71) Applicant: NETAPP, INC., Sunnyvale, CA (US)

(72) Inventors: Jeffrey Eric Semke, Allison Park, PA (US); Prabhu Hariharan, Fremont, CA (US); Balaji Ramani, Bangalore (IN); Bindiya Vasudevan Syamala, Aluva (IN)

(73) Assignee: NETAPP, INC., Sunnyvale, CA (US)

(*) Notice: Subject to any disclaimer, the term of this patent is extended or adjusted under 35 U.S.C. 154(b) by 138 days.

(21) Appl. No.: 14/524,816

(22) Filed: Oct. 27, 2014

(65) Prior Publication Data
US 2016/0119421 A1   Apr. 28, 2016

(51) Int. Cl.
   *H04L 29/08*   (2006.01)
(52) U.S. Cl.
   CPC ............... *H04L 67/1097* (2013.01)
(58) Field of Classification Search
   USPC ........................................................ 709/217
   See application file for complete search history.

(56) References Cited

U.S. PATENT DOCUMENTS

| | | | |
|---|---|---|---|
| 9,591,099 B1* | 3/2017 | Pittman | H04L 67/42 |
| 9,641,389 B2* | 5/2017 | Kothari | H04L 41/0846 |
| 2005/0270973 A1* | 12/2005 | Raev | H04L 69/162 370/218 |
| 2006/0173854 A1* | 8/2006 | Ottaviani | H04L 69/162 |
| 2008/0222266 A1* | 9/2008 | Banerjee | H04L 67/2814 709/208 |
| 2009/0113018 A1* | 4/2009 | Thomson | H04W 8/12 709/208 |
| 2009/0113109 A1* | 4/2009 | Nelson | G06F 11/2046 711/6 |
| 2009/0129261 A1* | 5/2009 | Visser | H04L 45/28 370/219 |
| 2012/0209937 A1* | 8/2012 | Bacher | H04L 67/1002 709/208 |
| 2012/0324447 A1* | 12/2012 | Huetter | G06F 9/5066 718/1 |
| 2015/0046921 A1* | 2/2015 | Allen | G06F 3/065 718/1 |

\* cited by examiner

*Primary Examiner* — Hermon Asres
(74) *Attorney, Agent, or Firm* — Pepper Hamilton LLP

(57) ABSTRACT

Methods and systems for managing access to virtual storage systems is provided. A listening socket is configured for an application for detecting communication for a plurality of virtual storage systems presented by a clustered storage system having a plurality of nodes. A packet is received at a node of the clustered storage system from a client system for a virtual storage system from among the plurality of virtual storage systems. An identifier for the virtual storage system for which the packet is destined is determined. A connection socket is cloned for the virtual storage system such that any other packet for a same connection and for the virtual storage system can be forwarded to the virtual storage system. Thereafter, the packet is processed by the application on behalf of the virtual storage system.

21 Claims, 8 Drawing Sheets

METHODS AND SYSTEMS FOR ACCESSING VIRTUAL STORAGE SERVERS IN A CLUSTERED ENVIRONMENT

TECHNICAL FIELD

The present disclosure relates to communication in networked storage systems.

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple users with access to shared data, backing up data and others.

A storage system typically includes at least one computing system executing a storage operating system for storing and retrieving data on behalf of one or more client computing systems ("clients"). The storage operating system stores and manages shared data containers in a set of mass storage devices.

The storage system may be implemented as a clustered storage system having a plurality of nodes. The storage system can be presented to client systems as virtual storage systems.

The virtual storage systems may use one or more applications for processing client requests. It is desirable not to execute a copy of the application for different virtual storage system because that would consume a large amount of memory. Continuous efforts are being made to enable access to virtual storage systems and the processes used by the virtual storage systems, without having to run multiple copies of the same application/processes.

SUMMARY

In one aspect, a machine implemented method is provided. The method includes configuring a listening socket for an application for detecting communication for a plurality of virtual storage systems presented by a clustered storage system having a plurality of nodes. The method further includes receiving a packet at a node of the clustered storage system from a client system for a virtual storage system from among the plurality of virtual storage systems; determining an identifier for the virtual storage system for which the packet is destined; cloning a connection socket for the virtual storage system such that any other packet for a same connection and for the virtual storage system can be forwarded to the virtual storage system; and processing the packet by the application on behalf of the virtual storage system.

In another aspect, a non-transitory, machine readable storage medium having stored thereon instructions for performing a method is provided. The machine executable code which when executed by at least one machine, causes the machine to: configure a listening socket for an application for detecting communication for a plurality of virtual storage systems presented by a clustered storage system having a plurality of nodes; receive a packet at a node of the clustered storage system from a client system for a virtual storage system from among the plurality of virtual storage systems; determine an identifier for the virtual storage system for which the packet is destined; clone a connection socket for the virtual storage system such that any other packet for a same connection and for the virtual storage system can be forwarded to the virtual storage system; and process the packet by the application on behalf of the virtual storage system.

In yet another aspect, a memory with machine readable medium comprising machine executable code having stored thereon instructions is provided. A processor module coupled to the memory is configured to execute the machine executable code to: configure a listening socket for an application for detecting communication for a plurality of virtual storage systems presented by a clustered storage system having a plurality of nodes; receive a packet at a node of the clustered storage system from a client system for a virtual storage system from among the plurality of virtual storage systems; determine an identifier for the virtual storage system for which the packet is destined; clone a connection socket for the virtual storage system such that any other packet for a same connection and for the virtual storage system can be forwarded to the virtual storage system; and process the packet by the application on behalf of the virtual storage system.

This brief summary has been provided so that the nature of this disclosure may be understood quickly. A more complete understanding of the disclosure can be obtained by reference to the following detailed description of the various thereof in connection with the attached drawings.

BRIEF DESCRIPTION OF THE DRAWINGS

The foregoing features and other features will now be described with reference to the drawings of the various aspects. In the drawings, the same components have the same reference numerals. The illustrated aspects are intended to illustrate, but not to limit the present disclosure. The drawings include the following Figures.

DETAILED DESCRIPTION

As a preliminary note, the terms "component", "module", "system," and the like as used herein are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various non-transitory computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

Methods and systems for managing access to virtual storage systems is provided. A listening socket is configured for an application for detecting communication for a plurality of virtual storage systems presented by a clustered storage system having a plurality of nodes. A packet is received at a node of the clustered storage system from a client system for a virtual storage system from among the plurality of virtual storage systems. An identifier for the virtual storage system for which the packet is destined is determined. A connection socket is cloned for the virtual storage system such that any other packet for a same connection and for the virtual storage system can be forwarded to the virtual storage system. Thereafter, the packet is processed by the application on behalf of the virtual storage system.

Figure 1A:
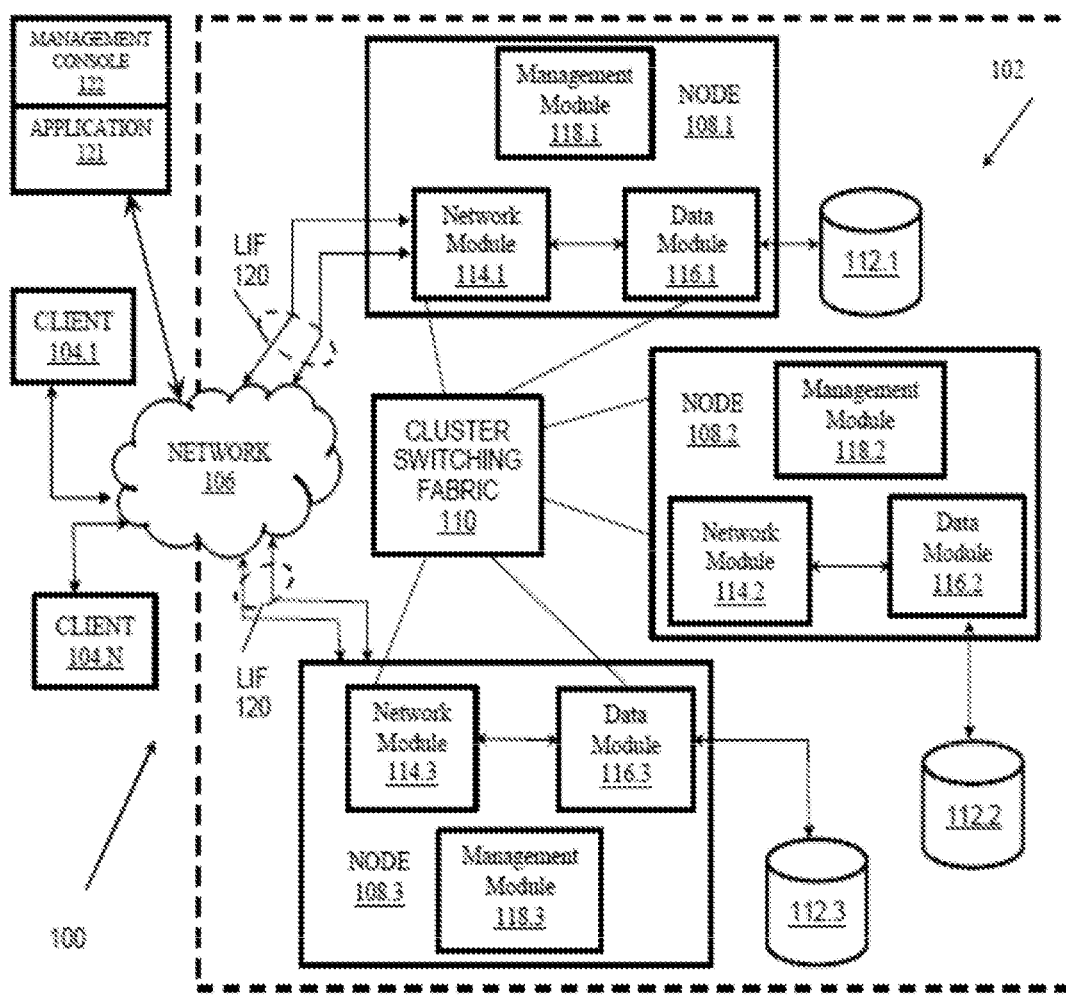
FIGS. 1A-1B show examples of operating environments for the various aspects disclosed herein.

Clustered System:

FIG. 1A shows a cluster based storage environment 100 having a plurality of nodes 108.1-108.3 where the various aspects disclosed herein can be implemented. Storage environment 100 may include a plurality of client computing systems (also referred to as a client system or client) 104.1-104.N, a clustered storage system 102 and at least a network 106 communicably connecting the client systems 104.1-104.N and the clustered storage system 102.

The plurality of nodes 108.1-108.3 are used for executing a plurality of modules as described below, a cluster switching fabric 110, and a plurality of mass storage devices 112.1-112.3 (may be also be referred to as 112). The mass storage devices 112 may include writable storage device media such as magnetic disks, video tape, optical, DVD, magnetic tape, non-volatile memory devices for example, self-encrypting drives, flash memory devices and any other similar media adapted to store information. The storage devices 112 may be organized as one or more groups of Redundant Array of Independent (or Inexpensive) Disks (RAID). The aspects disclosed are not limited to any particular storage device or storage device configuration.

The storage system 102 provides a set of storage volumes to clients for storing information at storage devices 112. A storage operating system executed by the nodes of storage system 102 present or export data stored at storage devices 112 as a volume, or one or more qtree sub-volume units. Each volume may be configured to store data files (or data containers or data objects), scripts, word processing documents, executable programs, and any other type of structured or unstructured data. From the perspective of client systems, each volume can appear to be a single storage drive. However, each volume can represent the storage space in at one storage device, an aggregate of some or all of the storage space in multiple storage devices, a RAID group, or any other suitable set of storage space.

The storage system 102 may be used to store and manage information at storage devices 112 based on a client request. The request may be based on file-based access protocols, for example, the Common Internet File System (CIFS) protocol or Network File System (NFS) protocol, over the Transmission Control Protocol/Internet Protocol (TCP/IP). Alternatively, the request may use block-based access protocols, for example, the Small Computer Systems Interface (SCSI) protocol encapsulated over TCP (iSCSI) and SCSI encapsulated over Fibre Channel (FCP).

Each of the nodes 108.1-108.3 is defined as a computing system to provide application services to one or more of the client systems 104.1-104.N. The nodes 108.1-108.3 are interconnected by the switching fabric 110, which, for example, may be embodied as a switch or any other type of connecting device.

Each of the plurality of nodes 108.1-108.3 is configured to include an network module, a data module, and an management module, each of which can be implemented as a processor executable module. For example, node 108.1 includes network module 114.1, data module 116.1, and management module 118.1, node 108.2 includes network module 114.2, data module 116.2, and management module 118.2, and node 108.3 includes network module 114.3, data module 116.3, and management module 118.3.

The network modules 114.1-114.3 include functionality that enable the respective nodes 108.1-108.3 to connect to one or more of the client systems 104.1-104.N over network 106 and with other nodes via switching fabric 110. The data modules 116.1-116.3 connect to one or more of the storage devices 112.1-112.3. The management modules 118.1-118.3 provide management functions for the clustered storage system 102. The management modules may execute a plurality of applications/processes for providing management related functions to clients, for example, storage status, network status and other information.

A switched virtualization layer including a plurality of logical interface (LIFs (may also be referred to as virtual interface (VIF)) 120 is provided to interface between the respective network modules 114.1-114.3 and the client systems 104.1-104.N, allowing storage 112.1-112.3 associated with the nodes 108.1-108.3 to be presented to the client systems 104.1-104.N as a single shared storage pool.

In one aspect, the clustered storage system 102 can be organized into any suitable number of virtual servers (may also be referred to as "Vservers" or virtual storage machines). A Vserver is a virtual representation of a physical storage controller/system and is presented to a client system for storing information at storage devices 112. Each Vserver represents a single storage system namespace with independent network access. Each Vserver has a user domain and a security domain that are separate from the user and security domains of other Vservers. Moreover, each Vserver is associated with one or more LIFs 120 and can span one or more physical nodes, each of which can hold one or more LIFs 120 and storage associated with one or more Vservers. Client systems can access the data on a Vserver from any node of the clustered system through the LIFs associated with that Vserver.

Although FIG. 1A depicts an equal number (i.e., 3) of the network modules 114.1-114.3, the data modules 116.1-116.3, and the management modules 118.1-118.3, any other suitable number of network modules, D-modules, and management modules may be provided. There may also be different numbers of network modules, data modules, and/or management modules within the clustered storage system 102. For example, in alternative aspects, the clustered storage system 102 may include a plurality of network modules and a plurality of data modules interconnected in a configuration that does not reflect a one-to-one correspondence between the network modules and data modules.

Each client system may request the services of one of the respective nodes 108.1, 108.2, 108.3, and that node may return the results of the services requested by the client system by exchanging packets over the computer network 106, which may be wire-based, optical fiber, wireless, or any other suitable combination thereof. The client systems may issue packets according to file-based access protocols, such as the NFS or CIFS protocol, when accessing information in the form of files and directories.

System 100 also includes a management console 122 executing a management application 121 out of a memory. Management console 122 may be used to configure and manage various elements of system 100. Management console 122 may be used to configure Vservers and network access addresses used by the network interface cards (NICs) of the cluster nodes.

Figure 1B:
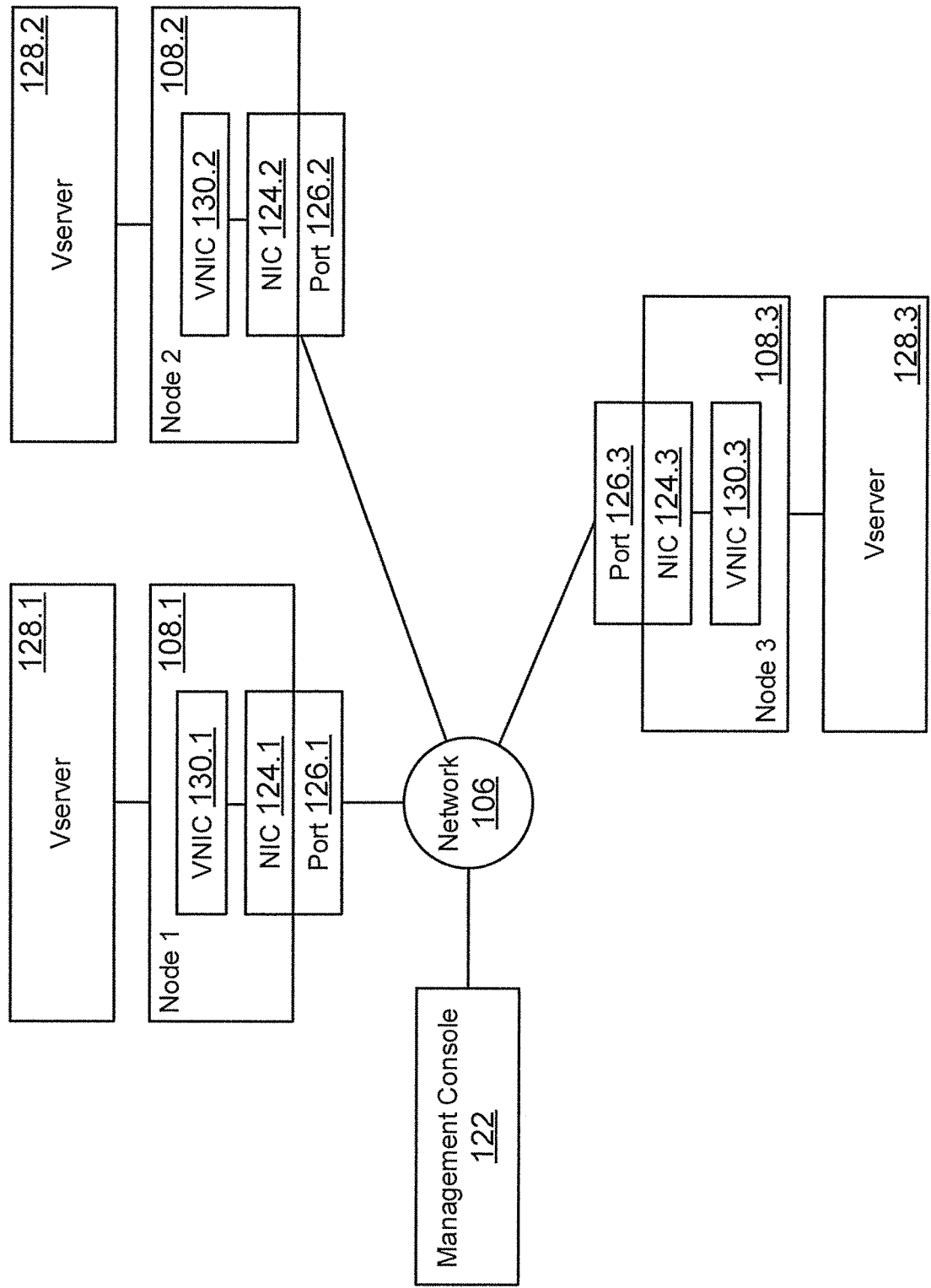

FIG. 1B shows an example of using NICs by one or more Vservers 128.1-128.3 presented to client systems. Each node has at least one NIC 124.1-124.3 with at least one physical port 126.1-126.3 that provide client connectivity to the various cluster nodes. Cluster nodes communicate with each other via a cluster adapter and fabric 110 (FIG. 1A). It is noteworthy that each node may have more than one cluster adapter for inter cluster and intra cluster communication.

Ports 126.1-126.3 of each NIC include logic and circuitry to send and receive packets. The structure of the logic and circuitry is such that it allows the NICs to handle packets complying with one or more protocols, for example, Ethernet, Fibre Channel and others.

NICs 124.1-124.3 include a processing device, a receiving and transmitting segments that are used to process incoming and outgoing packets. Details regarding the structure of NICs 124.1-124.3 are not germane to the various aspects described herein and hence are not described.

Each Vserver 128.1-128.3 may be presented with a virtual NIC (VNIC) 130.1-130.3 for sending and receiving packets. Each VNIC is a virtual representation of the physical NIC and this allows multiple Vservers to share a same physical NIC. It is noteworthy that a Vserver may use a physical NIC or a VNIC for communicating with clients.

Figure 2A:
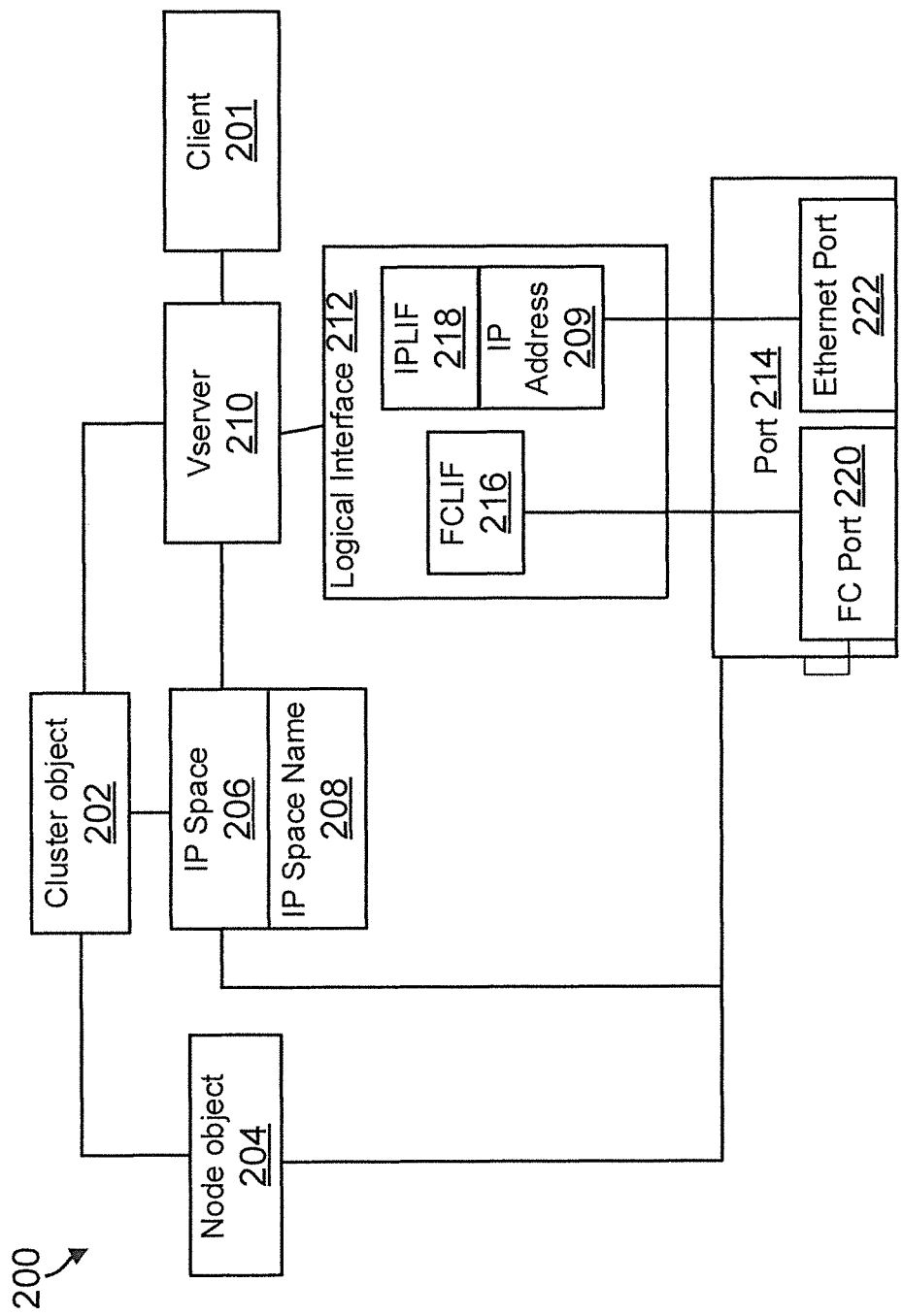
FIG. 2A shows an example of a layout for network addressing used by the various aspects of the present disclosure.

FIG. 2A shows an example of a hierarchical layout 200 that is used by the clustered storage system for managing network addressing, according to one aspect. Layout 200 is used by the management modules 118 for providing client systems access to management related information/services.

Layout 200 at a highest level includes a cluster object 202 that includes a cluster identifier and other information regarding the cluster, for example, node identifiers within the cluster. A node object 204 is used to store information regarding the nodes within the cluster object 202. The node object 204 identifies the node by a unique identifier and stores other information regarding the node.

A Vserver 210 (similar to 128.1-128.3) is associated with the cluster 202 and an Internet Protocol (IP) space 206 which is identified by a unique name or identifier 208. IP space 206 is an address space within which an IP address 209 is unique and may include more than one IP address. Although only one Vserver is shown as being associated with the IP space 206, more than one Vserver may be a part of the same IP space.

Most networks today use the TCP/IP protocol for communication. In the TCP/IP protocol, an IP address is used to uniquely identify a computing device. As an example, there are two standards for IP addresses: IP Version 4 (IPv4) and IP Version 6 (IPv6). IPv4 uses 32 binary bits to create a single unique address on the network. An IPv4 address is expressed by four numbers separated by dots. Each number is the decimal (base-10) representation for an eight-digit binary (base-2) number, also called an octet, for example: 216.27.61.137. IPv6 uses 128 binary bits to create a single unique address on the network. An IPv6 address is expressed by eight groups of hexadecimal (base-16) numbers separated by colons.

An IP address can be either dynamic or static. A static address is one that a user can configure. Dynamic addresses are assigned using a Dynamic Host Configuration Protocol (DHCP), a service running on a network. DHCP typically runs on network hardware such as routers or dedicated DHCP servers. It is noteworthy that the various aspects disclosed herein are not limited to DHCP or any other technique for assigning IP addresses.

Vserver 210 is associated with a LIF 212 (similar to 120, FIG. 1A). The Vserver 210 is presented to clients 201 (similar to 104) that use the LIF 212 to communicate with the clustered storage system.

LIF 212 at least uses a port 214 (similar to ports 126 (FIG. 1B)) to communicate with clients. LIF 212 includes an IP LIF 218 that is associated with an Ethernet port 222 and a FC (Fibre Channel) LIF 216 that is associated with a FC port 220 of port 214. IP address 209 is associated with IP LIF 218 and is unique within the IP space 206, as mentioned above. The Ethernet port 222 is used for Ethernet based communication, while storage traffic is handled by the FC port 220. It is noteworthy that port 214 may include a single port to handle both network and storage traffic.

Port 214 as an entity is associated with node 204 and IP space 206. The port may be a part of a physical NIC or may be a VNIC.

Figure 2B:
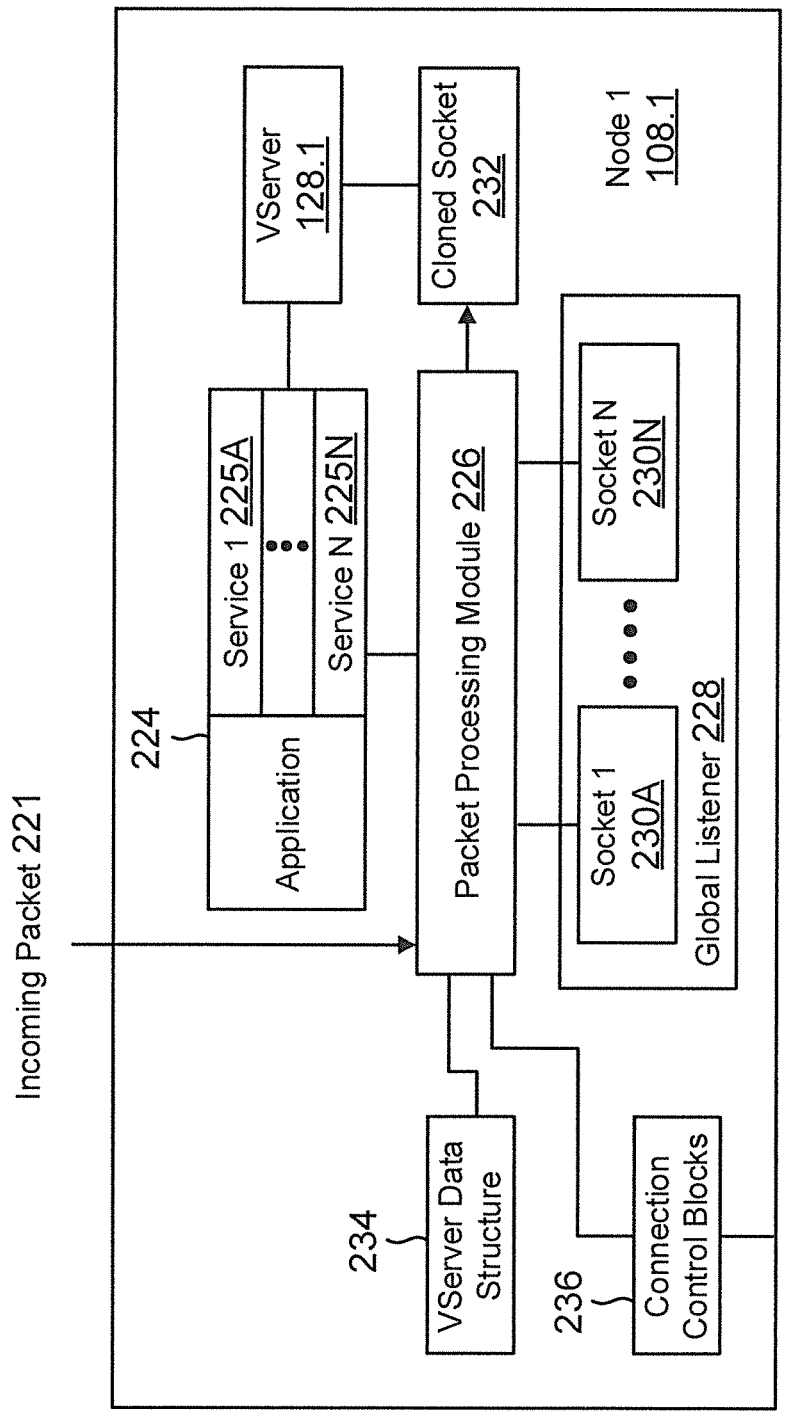
FIG. 2B shows an example of a system for using the layout of FIG. 2A, according to one aspect.

FIG. 2B shows an example of a system implemented at node 108.1 using layout 200 for interfacing with client 201, according to one aspect of the present disclosure. Node 108.1 executes a packet processing module 226 that may be implemented in software, hardware or a combination thereof. The packet processing module 226 may be executed by management module 118 or any other node component. Although packet processing module is shown as an individual block, different functions may be implemented by more than one functional block.

In one aspect, the packet processing module 226 interfaces with a global listener 228 for connections that may be made for different Vservers by an application, for example, application 224. Application 224 may provide different services for example, 225A-225N. An example of such services may be the Telnet services, encryption or any other service type.

The global listener 228 may be implemented as a service that maintains connection sockets 230A-230N. Each connection socket is created for an application and operates to "listen" for new connections for a Vserver. For example, application 224 may be associated with a connection socket 230A, while socket 230N may be a socket for a different process.

The term socket as used herein is an object that is used to define a connection having a plurality of fields. The socket at least includes a local IP address for the connection and a local port address that is used to create the connection. The socket object (may also be referred to as a "socket port") may also include a flag or any other indicator that indicates to the packet processing module that when a packet 221 arrives, then it has to insert a Vserver identifier in a cloned socket, as described below in detail.

The packet processing module 226 also has access to a Vserver data structure 234 that includes a Vserver identifier, a LIF assigned to the Vserver and an IP space identifier identifying the IP space to which the Vserver is assigned. Data structure 234 is used to identify a Vserver when packet 221 is received, as described below in detail.

Packet processing module 226 also maintains connection control blocks 236. Each control block includes a remote (i.e. a sender's) IP address, remote port (i.e. sender port) address, local (i.e. receiving) IP address, local port (i.e. receiving port) address, a Vserver identifier and a protocol (for example, TCP/UDP (User Datagram Protocol)). Details for using data structures 234 and 236 are provided below with respect to the process flows of FIGS. 2C-2D.

Figure 2C:
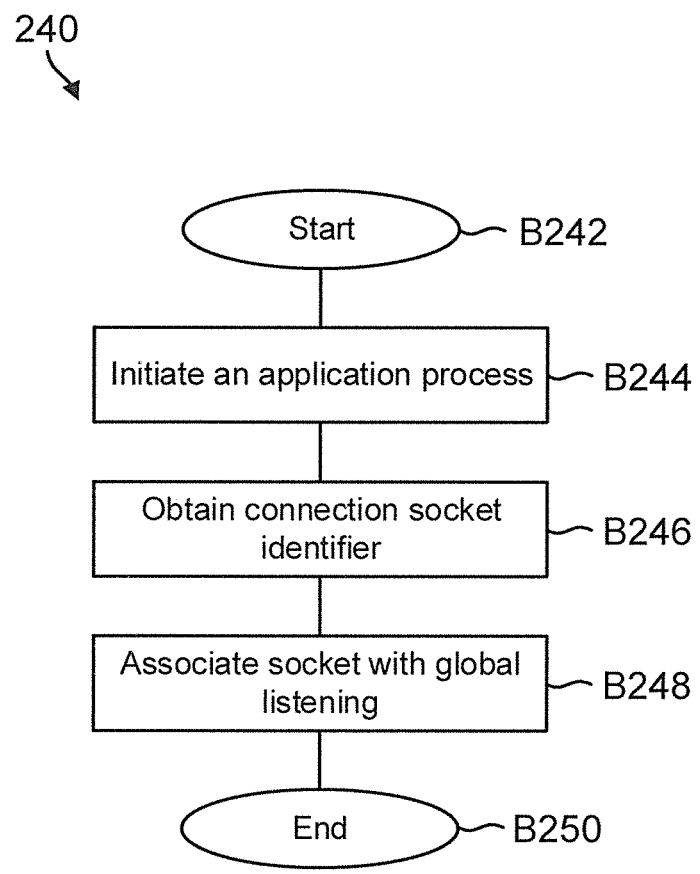
FIGS. 2C-2D show process flow diagrams, according to the various aspects of the present disclosure.

FIG. 2C shows a process 240 for configuring a global listening socket, according to one aspect. The process begins in block B242. Application 224 or a service related to the application is initialized in block B244. A listening socket (for example, 230A) for a connection is established. In one aspect, the socket is generated by the application (or the service). A connection identifier is obtained in block 3246. The connection identifier may be obtained by an operating system kernel that manages all the connections.

In block B248, the socket is enabled for global listening. The global listening allows the packet processing module 226 to insert Vserver identifier values when a socket is cloned as described below in detail. Thereafter, the process ends in block B250 indicating that the listening socket is ready to establish new connections and process client packets for a plurality of Vservers, without having to run individual copies of application 224.

Figure 2D:
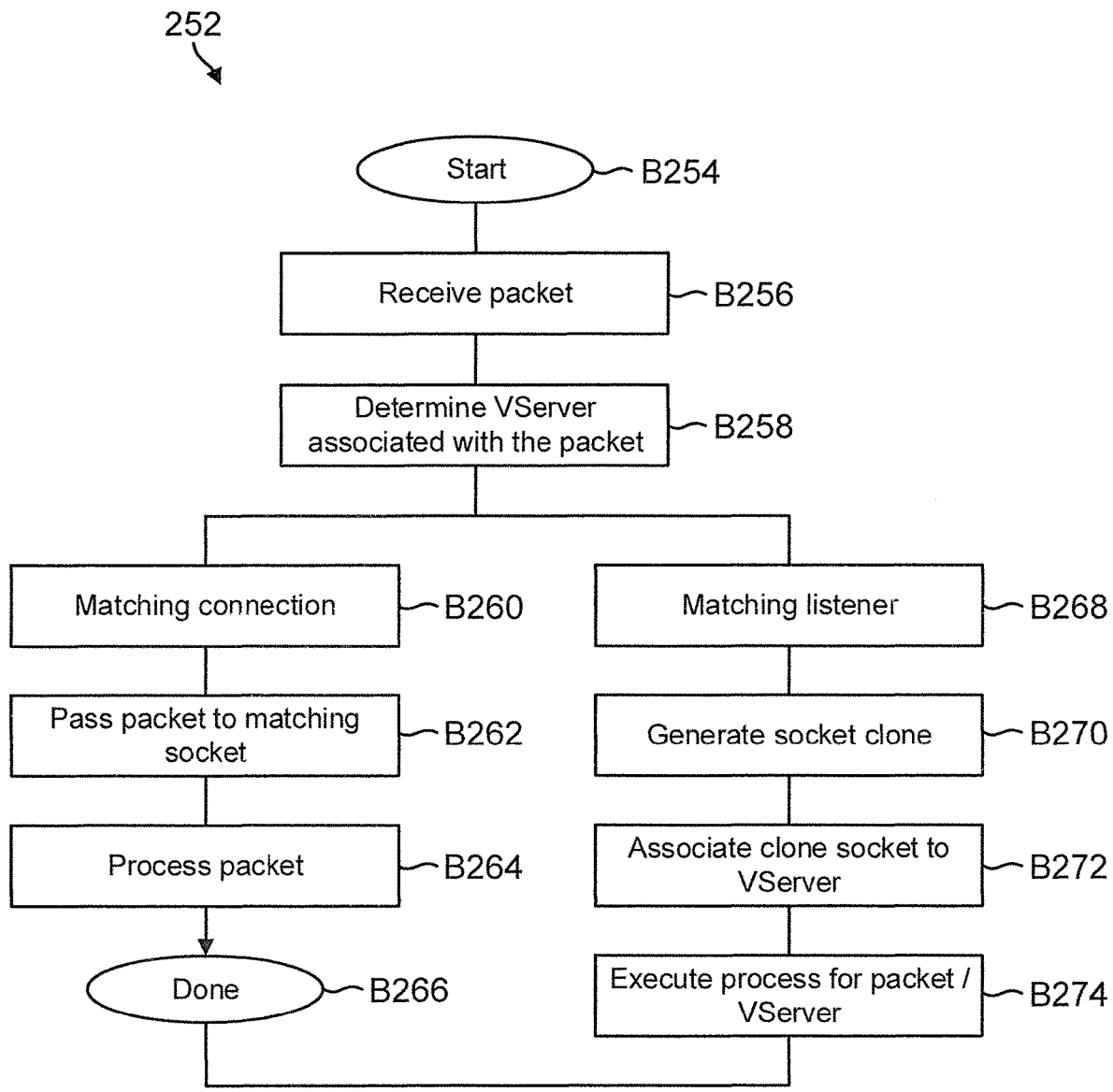

FIG. 2D shows a process 252 for using the global listening ability of the socket created in FIG. 2C, according to one aspect. The process begins in block B254, after the global listening socket has been created. In block B256, a packet is received for a connection. The packet may be from any client that has access to the clustered storage system. The packet may be to use an application or a service that is offered by the clustered storage system, for example, by the management module 118. Example of such services include Extended Internet Daemon ("xinetd") services (for example, Telnet, File Transfer Protocol, SSH services and others), SNMP (Simple Network Management Protocol) daemon services and others. The packet is received at a port of a NIC.

In block B258, the packet processing module 226 determines the Vserver associated with the packet. The packet includes information regarding the sender's IP address and the sender's port address. The packet also includes the destination IP address. The NIC port that received the packet is managed by a node. The node ascertains the port identifier of the port that received the packet. The packet processing module 226 uses the port identifier of the receiving port to perform a look-up of data structure 234. The look-up first provides the IP space associated with the receiving port. The IP space and the destination IP address is then used to obtain a Vserver identifier that identifies the Vserver associated with the packet.

After the Vserver information is obtained, the packet may take two different routes, a first route is for an existing matching connection and the second route is for a matching listening socket. The matching connection already has a connection control block for the connection, while for a matching connection, a control block is created using the Vserver identifier determined in block B258, as described below.

For selecting a processing route, the packet processing module 226 first looks for a matching connection in block 8260. Data structure 236 is used for determining if the packet is for a matching connection. The packet processing module performs a look-up using the Vserver identifier determined in block B258, the remote (sender's) port identifier, sender's IP address, the local port (the receiving port) identifier and the destination IP address fields to search control blocks 236. If there is a match on all the fields, then the packet is passed to a matching socket (i.e. a cloned socket 232) in block B262. In block 8264, the packet is processed and the appropriate action/service is taken/provided. The process then ends in block B266.

If there is no matching connection, then in block B268, the packet processing module 226 determines if there is a matching listener socket by searching the different sockets maintained by the global listener 228. This is determined by comparing the receiving port's identifier at which the packet is received, the Vserver identifier determined in block B258 and the local IP address associated with the Vserver. Based on the search, the connection socket (for example, 230A) is determined.

In block B270, the packet processing module 226 initiates a cloning operation that clones the listening socket 230A to a connection socket (shown as the cloned socket 232). The original listening socket 230A remains operational for other connections involving other Vservers. The cloned socket has the remote IP address, remote port address, local IP address, local port address and the Vserver identifier. A connection control block is also created such that future packets for the connections are routed appropriately. The cloned socket is associated with a Vserver in block B272. Thereafter, the application processes the packet in block B274. The process then is done in block B266 i.e. it waits for a next packet.

In one aspect, by cloning a global listening socket for a Vserver, allows the node to execute a single instance of application 224, while servicing client requests for the same application to different Vservers irrespective of IP spaces. Multiple copies of application 224 are not needed, which saves memory and overall processing time.

Figure 3:
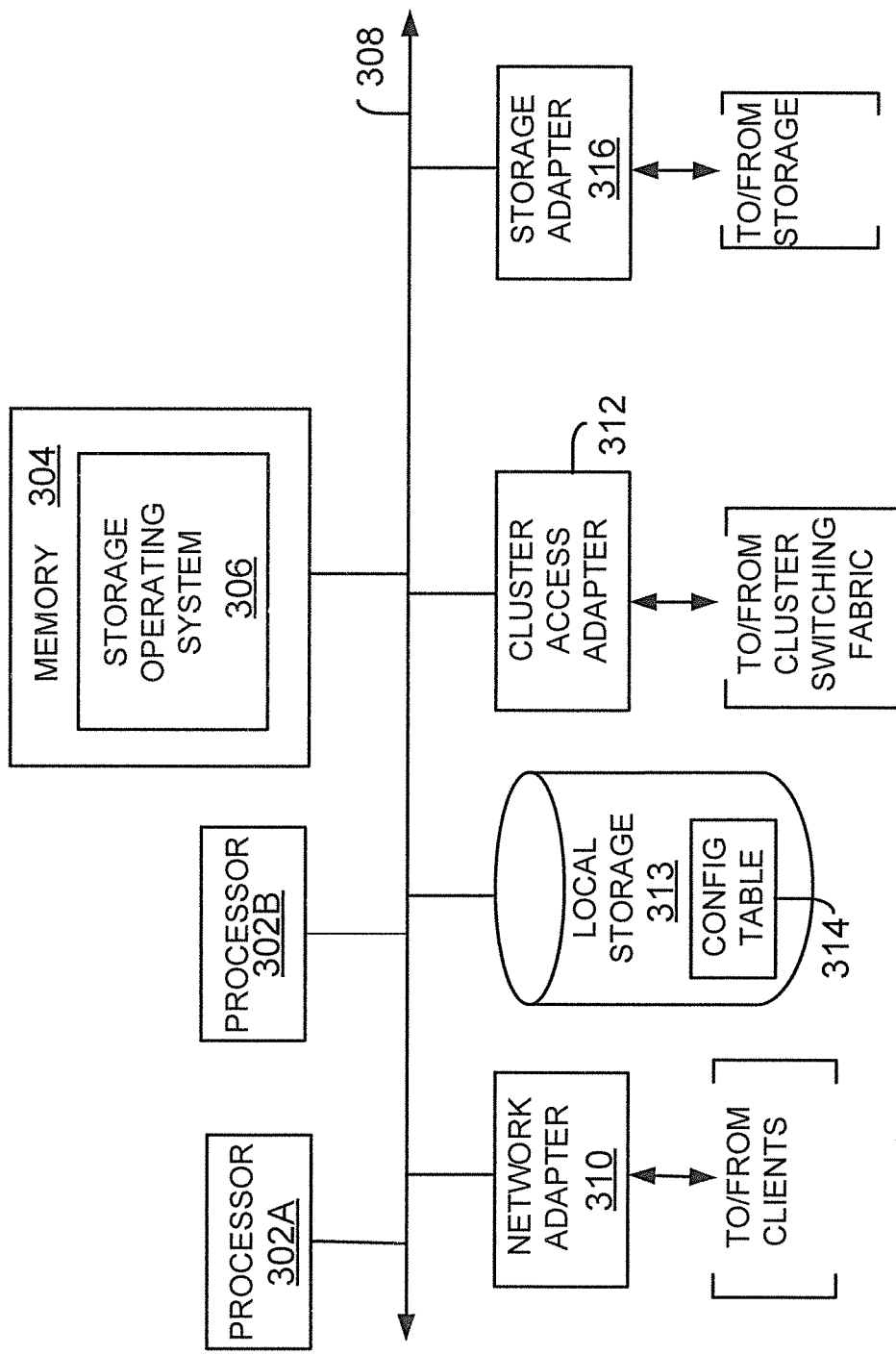
FIG. 3 is an example of a storage node used in the cluster of FIG. 1A, according to one aspect of the present disclosure.

Storage System Node:

FIG. 3 is a block diagram of node 108.1 that is illustratively embodied as a storage system comprising of a plurality of processors 302A and 302B, a memory 304, a network adapter 310, a cluster access adapter 312, a storage adapter 316 and local storage 313 interconnected by a system bus 308. The network adapter 310 includes ports that may be used by one or more Vservers to communicate with client systems as described above.

Processors 302A-302B may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices. The local storage 313 comprises one or more storage devices utilized by the node to locally store configuration information for example, in a configuration data structure 314.

The cluster access adapter 312 comprises a plurality of ports adapted to couple node 108.1 to other nodes of cluster 100. In the illustrative aspect, Ethernet may be used as the clustering protocol and interconnect media, although it will be apparent to those skilled in the art that other types of protocols and interconnects may be utilized within the cluster architecture described herein. In alternate aspects where the management modules, network modules and data modules are implemented on separate storage systems or computers, the cluster access adapter 312 is utilized by the management/network/data module for communicating with other management/network/data modules in the cluster 102.

Node 108.1 is illustratively embodied as a dual processor storage system executing a storage operating system 306 that preferably implements a high-level module, such as a file system, to logically organize the information as a hierarchical structure of named directories and files on storage 112. However, it will be apparent to those of ordinary skill in the art that the node 108.1 may alternatively comprise a single or more than two processor systems. Illustratively, one processor 302A executes the functions of the network module 114, management module 118, while the other processor 302B executes the functions of the data module 116. In another aspect, one processor executes the functions of management module 118, while the other processor executes the functions of both data module 116 and network module 114. In yet another aspect, a dedicated processor (not shown) may be used to execute the functions of management module 118.

The memory 304 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the presented disclosure.

The storage operating system 306 portions of which is typically resident in memory and executed by the processing elements, functionally organizes the node 108.1 by, inter alia, invoking storage operation in support of the storage service implemented by the node.

The network adapter 310 comprises a plurality of ports adapted to couple the node 108.1 to one or more clients over point-to-point links, wide area networks, virtual private networks implemented over a public network (Internet) or a shared local area network. The network adapter 310 thus may comprise the mechanical, electrical and signaling circuitry needed to connect the node to the network. The network adapter 310 ports are associated with IP spaces and Vservers, as described above.

The storage adapter 316 cooperates with the storage operating system 306 executing on the node 108.1 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on storage device 112. The storage adapter 316 comprises a plurality of ports having input/output (I/O) interface circuitry that couples to the storage devices over an I/O interconnect arrangement, such as a conventional high-performance, FC link topology.

Figure 4:
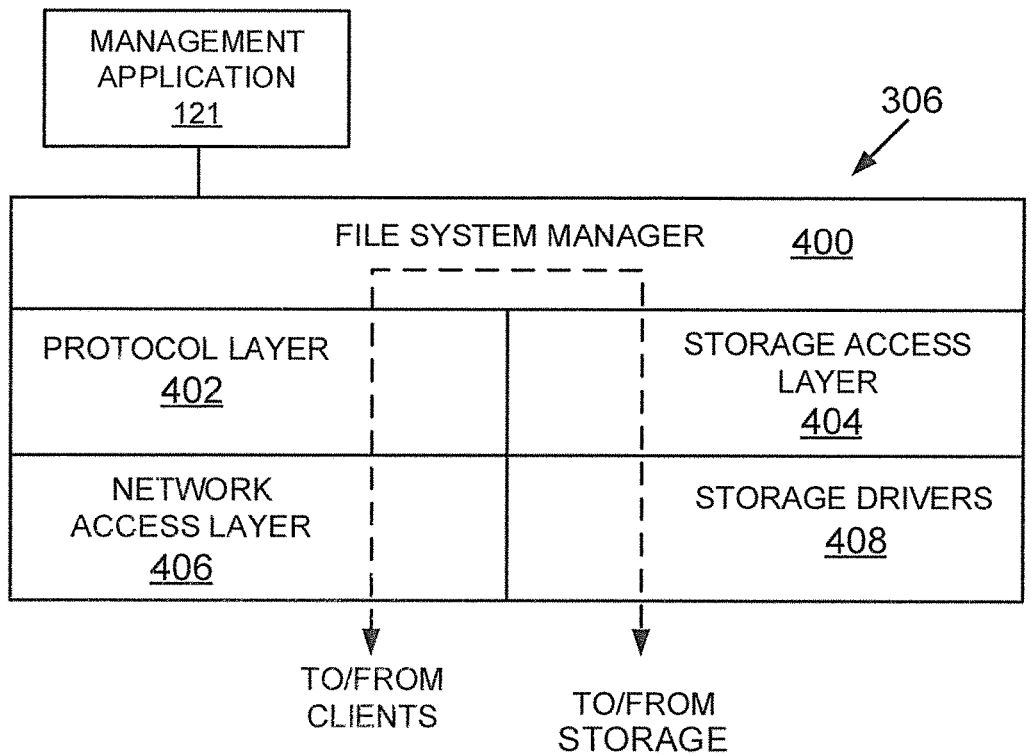
FIG. 4 shows an example of a storage operating system, used according to one aspect of the present disclosure.

Operating System:

FIG. 4 illustrates a generic example of storage operating system 306 executed by node 108.1, according to one aspect of the present disclosure. The storage operating system 306 interfaces with the management application 121 for configuring the IP space 206 and Vserver 210 described above with respect to FIG. 2A.

In one example, storage operating system 306 may include several modules, or "layers" executed by one or both of network module 114 and data module 116. These layers include a file system manager 400 that keeps track of a directory structure (hierarchy) of the data stored in storage devices and manages read/write operation, i.e. executes read/write operation on storage in response to client requests.

Storage operating system 306 may also include a protocol layer 402 and an associated network access layer 406, to allow node 108.1 to communicate over a network with other systems. Protocol layer 402 may implement one or more of various higher-level network protocols, such as NFS, CIFS, Hypertext Transfer Protocol (HTTP), TCP/IP and others, as described below.

Network access layer 406 may include one or more drivers, which implement one or more lower-level protocols to communicate over the network, such as Ethernet. Interactions between clients' and mass storage devices 112 are illustrated schematically as a path, which illustrates the flow of data through storage operating system 306.

The storage operating system 306 may also include a storage access layer 404 and an associated storage driver layer 408 to allow data module 116 to communicate with a storage device. The storage access layer 404 may implement a higher-level storage protocol, such as RAID (redundant array of inexpensive disks), while the storage driver layer 408 may implement a lower-level storage device access protocol, such as FC or SCSI. The storage driver layer 408 may maintain various data structures (not shown) for storing information LUN, storage volume, aggregate and various storage devices.

As used herein, the term "storage operating system" generally refers to the computer-executable code operable on a computer to perform a storage function that manages data access and may, in the case of a node 108.1, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the disclosure described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a storage device directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present disclosure may be utilized with any suitable file system, including a write in place file system.

Figure 5:
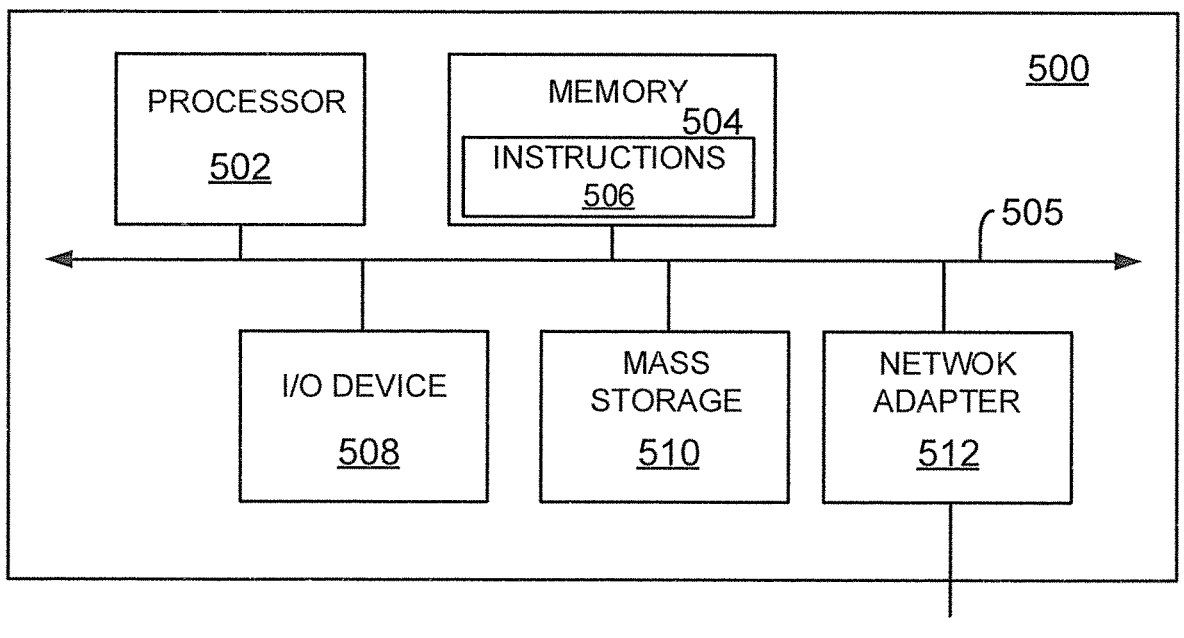
FIG. 5 shows an example of a processing system, used according to one aspect of the present disclosure.

Processing System:

FIG. 5 is a high-level block diagram showing an example of the architecture of a processing system 500 that may be used according to one aspect. The processing system 500 can represent the management console 122, a management module 118, or client 104. Note that certain standard and well-known components which are not germane to the present disclosure are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 implement the process steps described above with respect to FIGS. 2C-2D may reside in and executed (by processors 502) from memory 504.

Also connected to the processors 502 through the bus system 505 are one or more internal mass storage devices 510, and a network adapter 512. Internal mass storage devices 510 may be, or may include any conventional medium for storing large volumes of data in a non-volatile manner, such as one or more magnetic or optical based disks. The network adapter 512 provides the processing system 500 with the ability to communicate with remote devices (e.g., storage servers) over a network and may be, for example, an Ethernet adapter, a Fibre Channel adapter, or the like.

The processing system 500 also includes one or more input/output (I/O) devices 508 coupled to the bus system 505. The I/O devices 508 may include, for example, a display device, a keyboard, a mouse, etc.

Cloud Computing:

The system and techniques described above are applicable and useful in the upcoming cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to a network (for example, the Internet) that enables shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer, is a cloud platform and cloud infrastructure, followed by a "server" layer that includes hardware and computer software designed for cloud specific services.

Thus, methods and systems for managing access to Vservers have been described. Note that references throughout this specification to "one aspect" or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising:
    determining, by a computing device, a virtual server identifier for one of a plurality of virtual storage systems for which a packet received at a destination port is destined, wherein the packet is received via a connection with a client and the virtual server identifier is determined based on a destination Internet protocol (IP) address of the packet and an IP space associated with the destination port;
    identifying, by the computing device, a listening socket based on the determined virtual server identifier, a port identifier for the destination port, and the destination IP address;
    cloning, by the computing device, the listening socket to a connection socket for the one of the plurality of virtual storage systems, wherein the cloned listening socket comprises a source IP address of the packet, a source port of the packet, the destination IP address, a port address for the destination port, and the virtual server identifier and permits executing one instance of an application while servicing requests for the application to the plurality of virtual storage systems; and
    processing, by the computing device, the packet and one or more subsequent packets received via the connection with the client using the one instance of the application and the cloned listening socket.

2. The method of claim 1, further comprising performing, by the computing device, a lookup in a virtual server data structure using the port identifier for the destination port to retrieve the IP space associated with the destination port.

3. The method of claim 1, further comprising determining, by the computing device, the IP space within which the network access address is unique, wherein the virtual server identifier is associated with the IP space.

4. The method of claim 1, further comprising generating, by the computing device, a connection control block for the cloned listening socket, wherein the connection control block includes the virtual server identifier.

5. The method of claim 1, further comprising maintaining, by the computing device, a plurality of connection control blocks for each of one or more cloned listening sockets for each of the plurality of virtual storage systems to facilitate use of the one instance of the application by the plurality of virtual storage systems.

6. The method of claim 1, wherein the application offers different services and each of the different services is associated with a respective one or more connection control blocks.

7. The method of claim 4, further comprising passing, by the computing device, the one or more subsequent packets received via the connection with the client to the cloned listening socket based on a match of the virtual server identifier, source port identifier, source IP address, destination port identifier, and destination IP address of the one or more subsequent packets with the connection control block.

8. A non-transitory machine readable medium having stored thereon instructions for facilitating access to clustered virtual storage servers comprising machine executable code which when executed by at least one machine, causes the machine to:
   determine a virtual server identifier for one of a plurality of virtual storage systems for which a packet received at a destination port is destined, wherein the packet is received via a connection with a client and the virtual server identifier is determined based on a destination Internet protocol (IP) address of the packet and an IP space associated with the destination port;
   identify a listening socket based on the determined virtual server identifier, a port identifier for the destination port, and the destination IP address;
   clone the listening socket to a connection socket for the one of the plurality of virtual storage systems, wherein the cloned listening socket comprises a source IP address of the packet, a source port of the packet, the destination IP address, a port address for the destination port, and the virtual server identifier and permits executing one instance of an application while servicing requests for the application to the plurality of virtual storage systems; and
   process the packet and one or more subsequent packets received via the connection with the client using the one instance of the application and the cloned listening socket.

9. The non-transitory machine readable medium as set forth in claim 8, wherein the machine executable code, when executed by at least one machine, causes the machine to perform a lookup in a virtual server data structure using the port identifier for the destination port to retrieve the IP space associated with the destination port.

10. The non-transitory machine readable medium as set forth in claim 8, wherein the machine executable code, when executed by at least one machine, causes the machine to determine the IP space within which the network access address is unique, wherein the virtual server identifier is associated with the IP space.

11. The non-transitory machine readable medium as set forth in claim 8, wherein the machine executable code, when executed by at least one machine, causes the machine to generate a connection control block for the cloned listening socket, wherein the connection control block includes the virtual server identifier.

12. The non-transitory machine readable medium as set forth in claim 8, wherein the machine executable code, when executed by at least one machine, causes the machine to maintain a plurality of connection control blocks for each of one or more cloned listening sockets for each of the plurality of virtual storage systems to facilitate use of the one instance of the application by the plurality of virtual storage systems.

13. The non-transitory machine readable medium as set forth in claim 8, wherein the application offers different services and each of the different services is associated with a respective one or more connection control blocks.

14. The non-transitory machine readable medium as set forth in claim 11, wherein the machine executable code, when executed by at least one machine, causes the machine to pass the one or more subsequent packets received via the connection with the client to the cloned listening socket based on a match of the virtual server identifier, source port identifier, source IP address, destination port identifier, and destination IP address of the one or more subsequent packets with the connection control block.

15. A computing device comprising:
   a memory containing machine readable medium comprising machine executable code having stored thereon instructions for facilitating access to clustered virtual storage servers; and
   a processor coupled to the memory, the processor configured to execute the machine executable code to cause the processor to:
      determine a virtual server identifier for one of a plurality of virtual storage systems for which a packet received at a destination port is destined, wherein the packet is received via a connection with a client and the virtual server identifier is determined based on a destination Internet protocol (IP) address of the packet and an IP space associated with the destination port;
      identify a listening socket based on the determined virtual server identifier, a port identifier for the destination port, and the destination IP address;
      clone the listening socket to a connection socket for the one of the plurality of virtual storage systems, wherein the cloned listening socket comprises a source IP address of the packet, a source port of the packet, the destination IP address, a port address for the destination port, and the virtual server identifier and permits executing one instance of an application while servicing requests for the application to the plurality of virtual storage systems; and
      process the packet and one or more subsequent packets received via the connection with the client using the one instance of the application and the cloned listening socket.

16. The device of claim 15, wherein the processor is further configured to execute the machine executable code to cause the processor to perform a lookup in a virtual server data structure using the port identifier for the destination port to retrieve the IP space associated with the destination port.

17. The device of claim 15, wherein the processor is further configured to execute the machine executable code to cause the processor to determine the IP space within which the network access address is unique, wherein the virtual server identifier is associated with the IP space.

18. The device of claim 15, wherein the processor is further configured to execute the machine executable code to cause the processor to generate a connection control block for the cloned listening socket, wherein the connection control block includes the virtual server identifier.

19. The device of claim 15, wherein the processor is further configured to execute the machine executable code to cause the processor to maintain a plurality of connection control blocks for each of one or more cloned listening sockets for each of the plurality of virtual storage systems to facilitate use of the one instance of the application by the plurality of virtual storage systems.

20. The device of claim 15, wherein the application offers different services and each of the different services is associated with a respective one or more connection control blocks.

21. The device of claim 18, wherein the processor is further configured to execute the machine executable code to cause the processor to pass the one or more subsequent packets received via the connection with the client to the cloned listening socket based on a match of the virtual server identifier, source port identifier, source IP address, destination port identifier, and destination IP address of the one or more subsequent packets with the connection control block.

\* \* \* \* \*